US012507638B2

(12) United States Patent
Brenner et al.

(10) Patent No.: US 12,507,638 B2
(45) Date of Patent: Dec. 30, 2025

(54) LIVING WALL SYSTEM

(71) Applicant: Habitat Horticulture, Berkeley, CA (US)

(72) Inventors: David Brenner, Albany, CA (US); Michael Carson Mangan, El Cerrito, CA (US); Mateo Aguilar, San Francisco, CA (US); Phillip Greenberg, Hayward, CA (US)

(73) Assignee: Habitat Horticulture LLC, Berkeley, CA (US)

(*) Notice: Subject to any disclaimer, the term of this patent is extended or adjusted under 35 U.S.C. 154(b) by 0 days.

(21) Appl. No.: 18/743,927

(22) Filed: Jun. 14, 2024

(65) Prior Publication Data

US 2024/0341242 A1 Oct. 17, 2024

Related U.S. Application Data

(63) Continuation-in-part of application No. 17/869,112, filed on Jul. 20, 2022, now abandoned.

(51) Int. Cl.
*A01G 9/02* (2018.01)

(52) U.S. Cl.
CPC .................................... *A01G 9/025* (2013.01)

(58) Field of Classification Search
CPC ...................................................... A01G 9/025
USPC ........................................................... 47/66.6
See application file for complete search history.

(56) References Cited

U.S. PATENT DOCUMENTS

| | | | | |
|---|---|---|---|---|
| 9,462,755 | B1 * | 10/2016 | Coraggio | A01G 9/025 |
| 2011/0059518 | A1 * | 3/2011 | Bribach | A01G 9/025 435/266 |
| 2013/0067809 | A1 * | 3/2013 | Heather | A01G 9/246 47/65.8 |
| 2013/0160363 | A1 * | 6/2013 | Whitney | A01G 9/025 47/59 S |
| 2014/0370238 | A1 * | 12/2014 | Vanderbecken | B32B 37/065 156/290 |
| 2019/0029194 | A1 * | 1/2019 | Janssen | B01F 23/23 |

FOREIGN PATENT DOCUMENTS

| | | | | |
|---|---|---|---|---|
| CN | 109952918 A * | 7/2019 | | A01G 22/25 |
| DE | 102020123619 A1 * | 3/2022 | | A01C 1/044 |
| DE | 202024105159 U1 * | 9/2024 | | A01G 9/025 |
| FR | 2956283 A1 * | 8/2011 | | A01G 9/025 |
| WO | WO-2012000063 A1 * | 1/2012 | | A01G 9/022 |
| WO | WO-2022002927 A1 * | 1/2022 | | A01G 9/025 |

* cited by examiner

*Primary Examiner* — Kimberly S Berona
*Assistant Examiner* — Erica Michelle Huebner
(74) *Attorney, Agent, or Firm* — Christopher Pilling

(57) ABSTRACT

A living wall system generally having a number of layers including a waterproof membrane layer for preventing water and moisture from seeping to the building structure or wall in which the living wall system is installed. Next, a number of growing medium layers are provided having a wicking fabric layer between them, the growing medium typically of felt. The wicking fabric layer ensures even watering and smooth capillary action. The front growing medium layer has plant pockets for holding plants.

3 Claims, 7 Drawing Sheets

LIVING WALL SYSTEM

CROSS-REFERENCE TO RELATED APPLICATIONS

The present application is a continuation in part application to U.S. patent application Ser. No. 17/869,112 filed Jul. 20, 2022, which is incorporated in its entirety, at least by reference.

BACKGROUND OF THE INVENTION

1. Field of the Invention

The present invention relates generally to horticulture but more particularly to a living wall system.

2. Description of Related Art

Living walls, sometimes called green walls or vertical gardens, are vertically built structures configured to hold vegetation. While living walls have a great aesthetic appeal, they also provide good insulation to reduce the temperature of the building in which the living wall is installed. This makes living walls popular in urban environments. When installed indoors, living walls can improve air quality, climate, noise levels, and reduce $CO_2$.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present disclosure to provide a living wall system configured to move water evenly throughout the system. It is another object of the invention to provide a living wall system having efficient wicking with excellent capillary action to keep the vegetation saturation level optimal. It is yet another object of the invention to provide a living wall system to eliminate water dripping off the living wall.

In order to do so, a living wall system is provided comprising a waterproof membrane layer; a rear growing medium layer; a wicking fabric layer; a front growing medium layer, wherein the front growing medium layer comprises plant pockets configured to hold plants; and, one or more irrigation lines configured to supply water to the plants, wherein the wicking fabric layer is configured to move the water evenly throughout the living wall system such that the plants maintain ideal saturation.

In one embodiment, the rear growing medium layer and the front growing medium layer is constructed of felt. In one embodiment, the plant pockets are staggered incisions within the felt of the front growing medium layer. In another embodiment, the plant pockets are sewn into the felt of the front growing medium layer. In one embodiment, the layers are arranged from back to front of the living wall system as follows: the waterproof membrane layer, the rear growing medium layer, the wicking fabric layer, and the front growing medium layer. In yet another embodiment, a multi-wall polycarbonate panel positioned between the waterproof membrane layer and the rear growing medium layer is provided. In one embodiment, the multi-wall polycarbonate panel is fastened to galvanized steel furring channels. In one embodiment, an irrigation catch basin at the bottom of the living wall system configured to catch and collect the water is provided, wherein the catch basin funnels into a drain pipe. In one embodiment, a base member is provided, wherein the base member is configured to be attached to a wall of a structure or building. In one embodiment, the plant pockets allow individual plants to be changed, removed, or installed within the living wall system without the need to pre-grow the individual plants at a different location. In another embodiment, the plant pockets are configured to keep the plants from falling off the living wall system. In yet another embodiment, the wicking fabric layer is two layers of wicking fabric layers.

In another aspect of the invention, a living wall system is provided, comprising a number of layers in the following order: (a) a base configured to attached to a wall or structure; (b) a waterproofing membrane preventing moisture from transferring between the living wall system and the wall or structure; (c) a twin wall polycarbonate panel; (d) a first felt growing medium layer; (e) a first wicking fabric layer; (f) a second wicking fabric layer; (g) a rockwool layer; (h) a second felt growing medium layer, wherein the second felt growing medium layer comprises plant pockets configured to hold plants; and, one or more irrigation lines configured to supply water to the plants, wherein the wicking fabric layer is configured to move the water evenly throughout the living wall system such that the plants maintain ideal saturation.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a living wall system.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about," "generally," or "approximately," apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Figure 1:
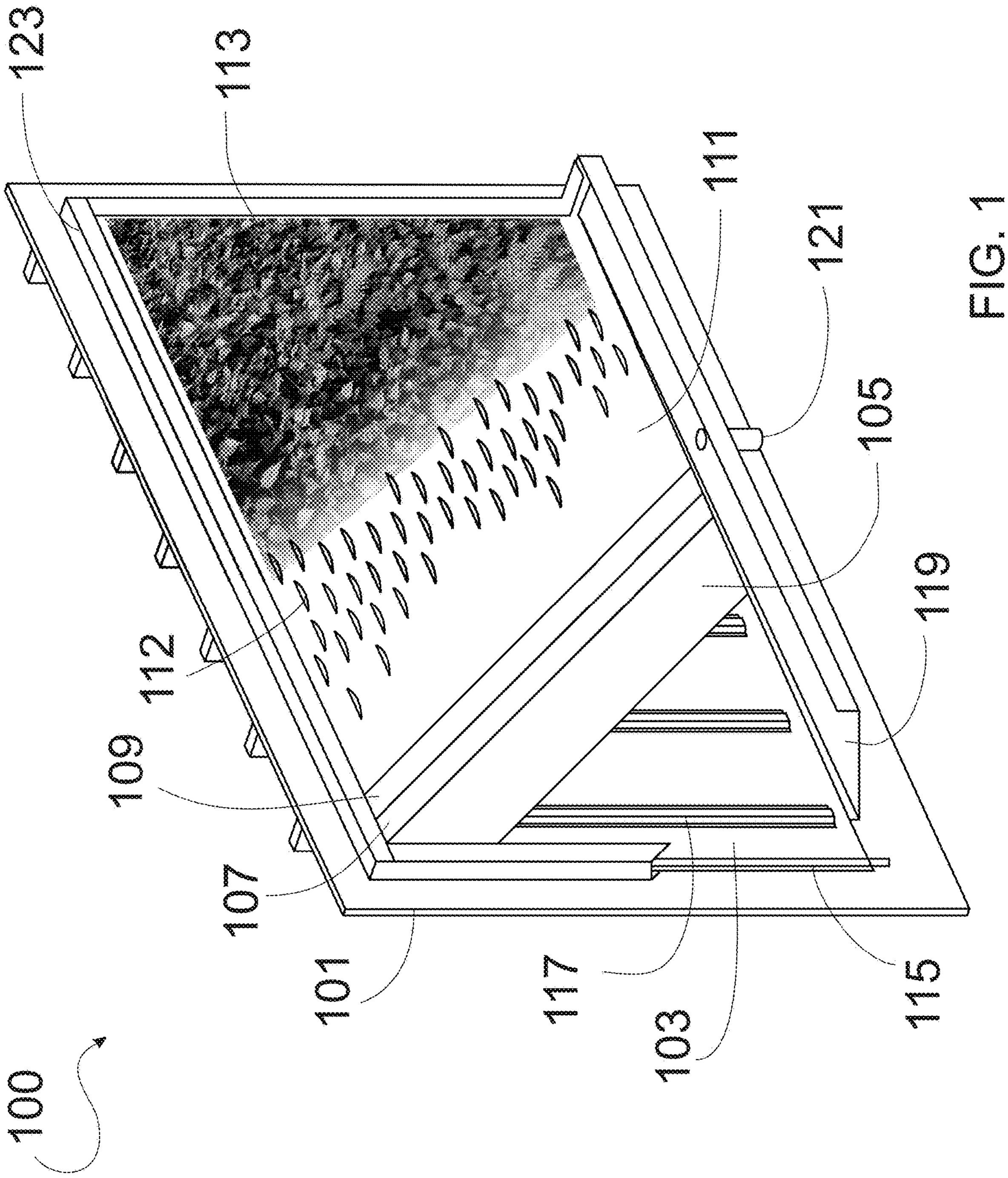
FIG. 1 is a perspective view of the living wall according to an embodiment of the present invention.

FIG. 1 is a perspective view of the living wall according to an embodiment of the present invention. Referring now to FIG. 1, the living wall system 100 is illustrated. In one embodiment, the living wall is configured to be attached to a wall of a building or other structure (not shown) as well known in the art. In one embodiment, a base 101 is used for the attachment to the wall, wherein the base may be plywood, steel, or another sturdy material. The base allows for the living wall's layers to be installed and is generally outside the scope of the invention. Any known method for attaching a living wall to the wall of a building, structure, etc. may be used without departing from the spirt and scope of the invention.

Still referring to FIG. 1, a waterproofing membrane layer 103 is directly attached to the base, preventing the base as well as the structure's wall from moisture during use. In one embodiment, waterproofing membrane layer 103 is a self-adhesive rubberized asphalt/polyethylene waterproofing membrane, such as Bituthene© 3000. In some embodiments, a multi-wall polycarbonate panel 105 provides the next layer of the system. In one embodiment, the multi-wall polycarbonate panel 105 is a twin-wall polycarbonate panel or other plastic, PVC, metal, or thermoplastic providing UV resistance. In one embodiment, the multi-wall polycarbonate panel 105 is ⅜". In some embodiments, the multi-wall polycarbonate panel 105 is fastened to galvanized steel furring/hat channels 117 or similar. In one embodiment, the hat channels 117 are ⅞" 20 gauge, but it is understood the size may vary.

Next, a growing medium layer 107 is provided. In some embodiments, multiple layers of growing medium may be provided. For example, in one embodiment, two layers of ¼" growing medium are provided. The growing medium substance may be any type of material in which plants are configured to grow including but not limited to soil, peat moss, gravel, perlite, pumice, shale, foam, coco coir, felt, porous fabric, rock-wool, clay balls, bark, rice hulls, vermiculite, sand, or any other known growing medium. In a preferred embodiment, felt is used.

Still reviewing to FIG. 1, next a wicking fabric layer 109 is provided. In some embodiments, multiple wicking fabric layers may be provided. Advantageously, the wicking fabric layer 109 is configured to help move water evenly throughout the system. The wicking fabric layer 109 has excelled capillary action, keeping the plants 113 saturated, but not too wet. That is, the wicking fabric layer 109 provides an optimal saturation level for the plants 113. The plants will be discussed in greater details below. In one embodiment, the wicking fabric is comprised of microfiber. In another embodiment, the wicking fabric is a needle punched microfiber polyester and polyamide blend.

The front layer of the system is another growing medium layer 111 having plant pockets 112 configured to hold plants 113. In one embodiment, the front growing medium layer is felt. In one embodiment, the plant pockets 112 are incisions made in the front growing medium layer 111. In alternative embodiments, felt is used to allow for growing plant pockets 112 to be sewn into the felt material. It is a particular advantage of the present invention to provide plant pockets 112 as it allows individual plants 113 to be changed, removed, or installed without the need to pre-grow the plants within a panel at a different location which is common practice for living walls. Further, the plant pockets 112 are configured to hold the plants 113 within the pockets preventing the plants from falling out/off the living wall growing medium in high wind conditions or before deep plant roots are established. In some embodiments, the plants 113 are secured in place using stainless steel staples or other fastening members secured through the growing medium layers (111 and 107) and any intermediate layers (109) into the multi-wall polycarbonate panel 105. In some embodiments, the plant pockets 112 are staggered in position along the front growing medium layer 111.

Still referring to FIG. 1, a water supply or irrigation line 115 is provided from the top of the system leading to an irrigation catch basin 119 which is configured to collect all the water runoff from the system. In some embodiments, the irrigation catch basin 119 leads into a drain pipe 121. The drain pipe may be coupled or directed to a primary drain at the specific location of where the living wall system is installed. In one embodiment, the drain pipe 121 is a 1.5" stainless steel cylindrical drain pipe that is welded to the catch basin, which is also stainless steel. In some embodiments, the catch basin and/or drain pipe may be integrated with the ground flooring or below the ground flooring such that it is hidden from view. In the same scope, in some embodiments, aesthetic framing 123 around the perimeter of the living wall system may be provided. Although one irrigation line 115 is illustrated, several irrigation lines may be provided. In one embodiment, the irrigation lines are configured to be embedded between the layers of growing medium across the entire width of the living wall 100. Further, any water control systems, computers, valves, pumps, etc. may be included as well known in the art. In one embodiment, a fertigation system (not illustrated) is used to provide the ideal amount of water and nutrients to the plants 113 during use.

Figure 2B:
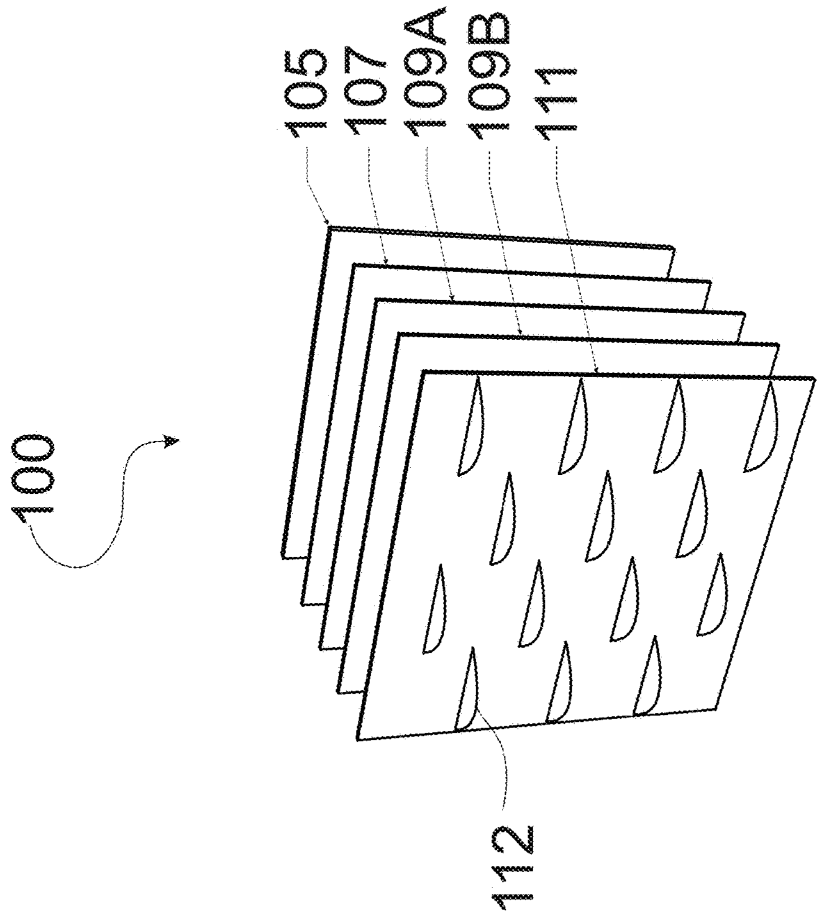
FIG. 2B is an exploded view of FIG. 2A.
Figure 2A:
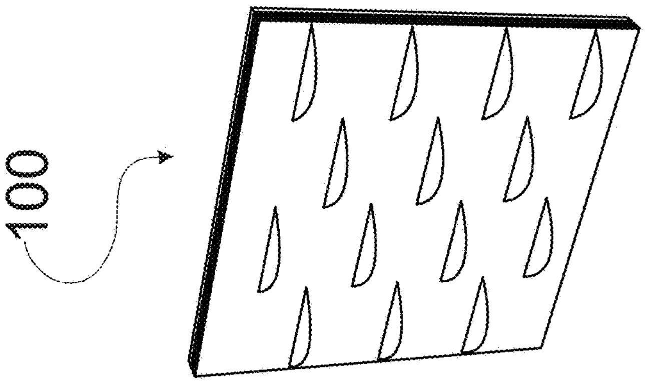
FIG. 2A is a simplified perspective view of the living wall according to an embodiment of the present invention.

Referring now to FIG. 2A-B, a simplified version of the living wall 100 is shown to exemplify the layers of the system. In some embodiments, the living wall system 100 includes layering from back to front as follows: a multi-wall polycarbonate panel 105, a rear felt growing medium layer 107, two middle layers of microfiber wicking fabric 109A and 109B, an a front felt growing medium layer 111 having plant pockets 112 as previously discussed. The waterproof membrane and wall structural members are not shown.

Figure 3B:
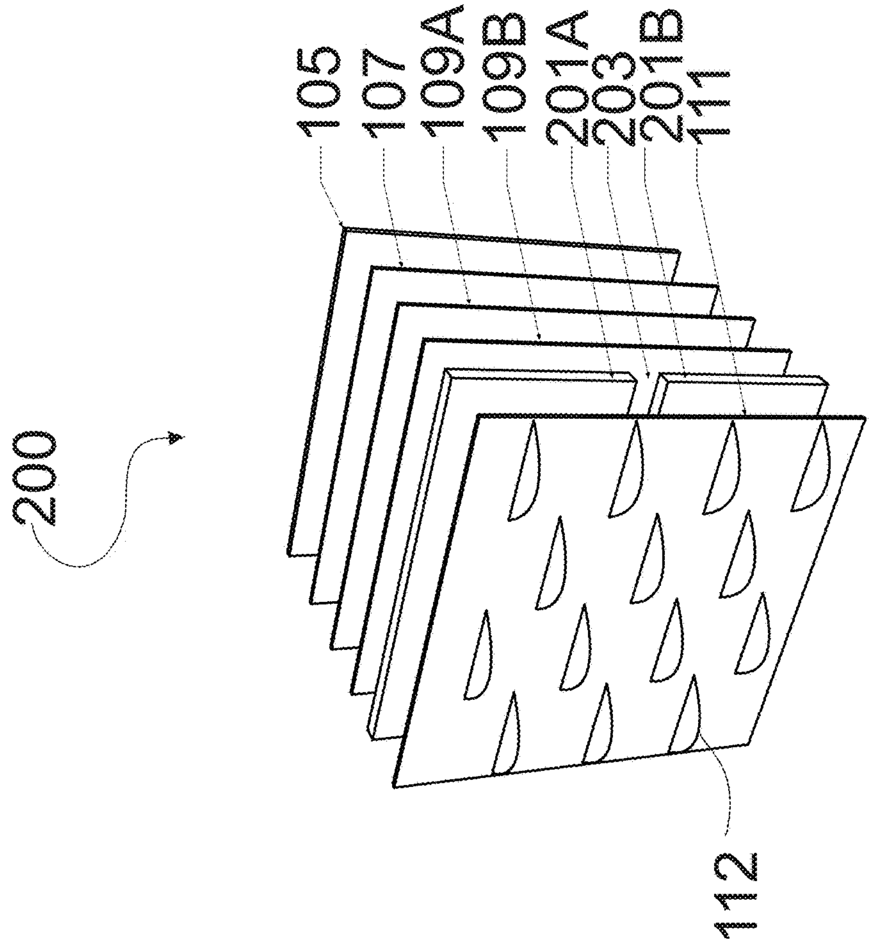
FIG. 3B is an exploded view of FIG. 3A.
Figure 3A:
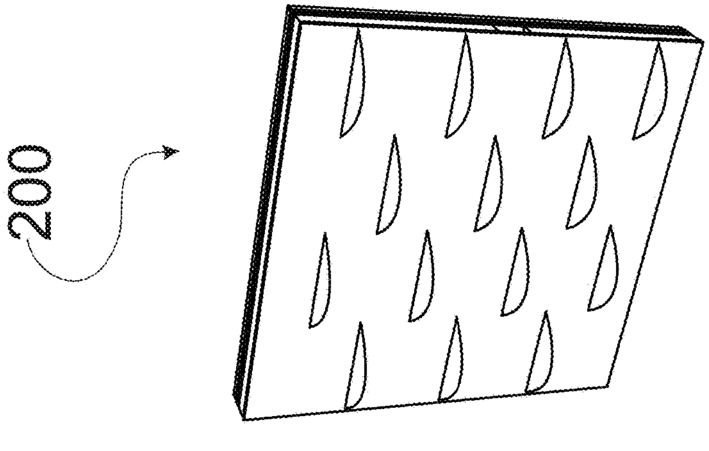
FIG. 3A is a simplified perspective view of an alternative living wall having capillary breaks according to an embodiment of the present invention.

Referring now to FIGS. 3A-B, an alternative embodiment of a living wall system 200 having capillary breaks is provided. In this embodiment, the alternative living wall system 200 comprises layers, from back to front as follows: a multi-wall polycarbonate panel 105, a rear felt growing medium layer 107, two middle layers of microfiber wicking fabric 109A and 109B, a rockwool panel 201A and 201B having a capillary break 203, and a front felt growing medium layer 111 having plant pockets 112. The capillary break 203 in the rockwool panel (201A/201B) provides and prevents the movement of water within the system at the capillary break to stop the capillary action as well known in the art. In some embodiments, the rockwool panel is any mineral wool or similar. In some embodiments, the rockwool panel can be replaced with a wicking fabric layer having a capillary break. In yet other embodiments, the capillary break may be position on one or more of the middle microfiber wicking fabric layers (109A/109B).

Figure 4B:
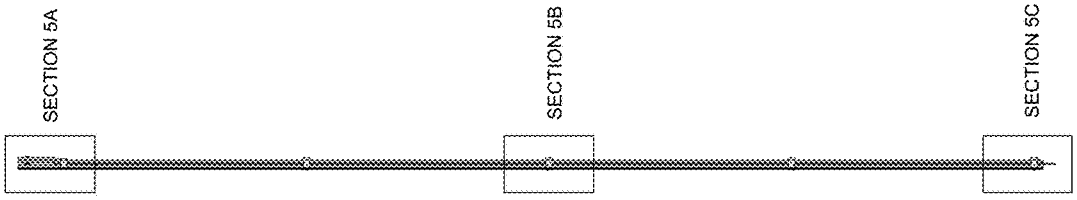
FIG. 4B is a side view of FIG. 4A.
Figure 4A:
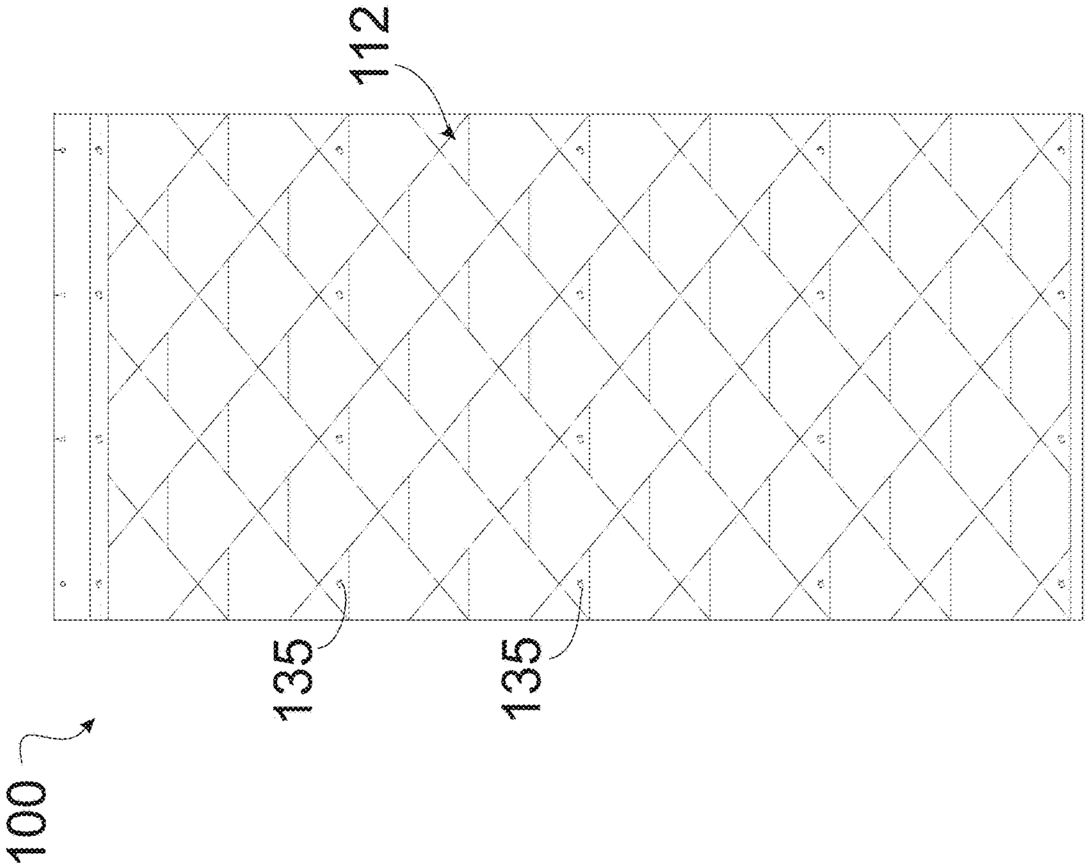
FIG. 4A is a front view of a living wall system according to an embodiment of the present invention.
Figure 5B:
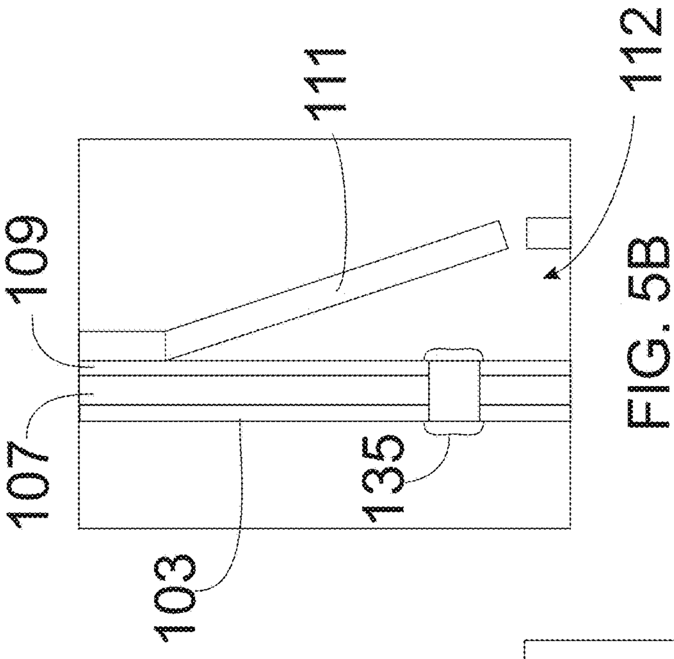
FIGS. 5A-C are sectional views of FIG. 4B.
Figure 5C:
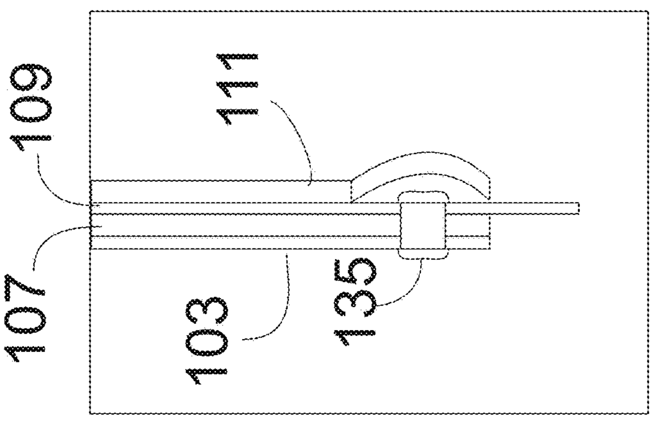
Figure 5A:
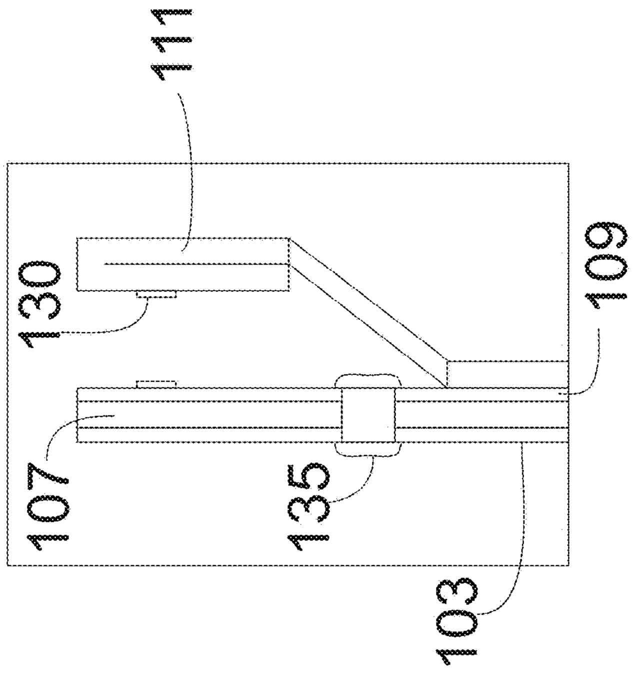

As previously mentioned, in some embodiments, the plant pockets are sewn into the front growing layer. FIGS. 4-5 illustrate this arrangement. Referring now to FIGS. 4A-B, a living wall 100 is shown with sewn in plant pockets 112. Fastening grommets 135 are also provided at specific locations on the living wall 100. Referring now to FIG. 5A, in the top of the wall, a snap button 130 is secured to the front growing layer 111 to retain a top portion of an irrigation line (not shown). In one embodiment, the front growing layer is constructed of felt. In some embodiments, one or more grommets 135 are used to secure the layers together, including the waterproof membrane 103, rear growing medium layer 107, also constructed of felt, and the microfiber wicking layer 109. Similarly in FIG. 5B, at the middle section, one or more grommets 135 are used to secure the waterproof membrane 103, rear felt growing medium layer 107, and the microfiber wicking layer 109. In each case, the grommets 135 are installed behind the front felt growing medium layer 111. A plant pocket 112 is also visible in this view. Last, in FIG. 5C, at the bottom of the wall, one or more grommets 135 are used to secure the waterproof membrane 103, rear felt growing medium layer 107, and the microfiber wicking layer 109 behind the front felt growing medium layer 111.

It should be understood that the size of the living wall system may vary. Often, several sections or panels of each layer are needed to meet the size requirement for a specific living wall installation. Thus, in some embodiments, the panels/layers are prefabricated such that each panel joins the adjacent panel, wherein the adjacent panel is tucked in (the top panel overlapping the bottom panel) such that during irrigation water continues down to the panel below without issues.

In another embodiment of the present invention, the living wall system employs a twin wall polycarbonate panel 105 as a structural backing. This panel 105 is specifically chosen for its lightweight properties, weighing approximately half as much as comparable plastic materials. Despite its light weight, it provides robust support for the plants attached to the wall system. A significant advantage of using the twin wall polycarbonate panel 105 is its ease of modification; plants can be replaced with minimal effort, unlike systems that utilize PVC backing boards, which are often difficult to modify and can hinder long-term maintenance due to their rigid nature.

Figure 6A:
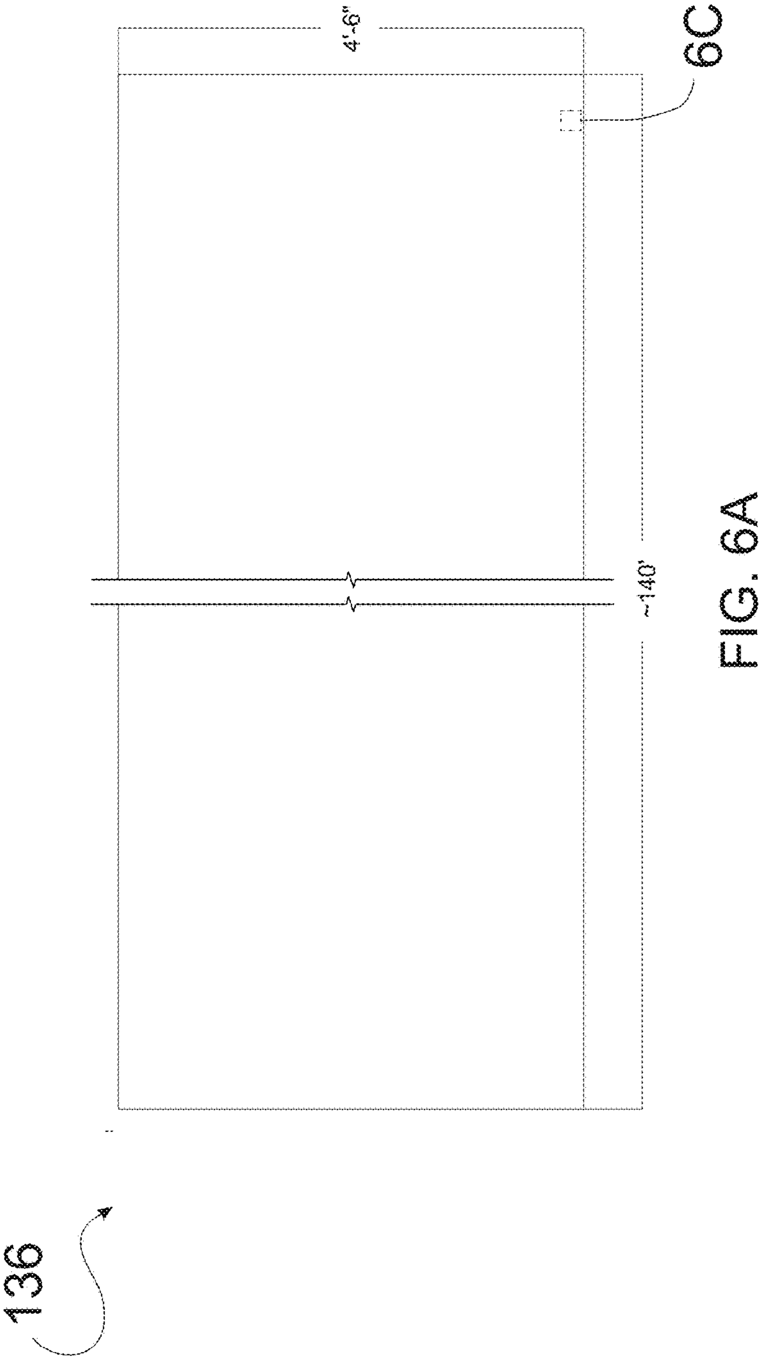
FIG. 6A is a perspective view of a woven microfiber fabric roll according to an embodiment of the present invention.
Figure 6B:
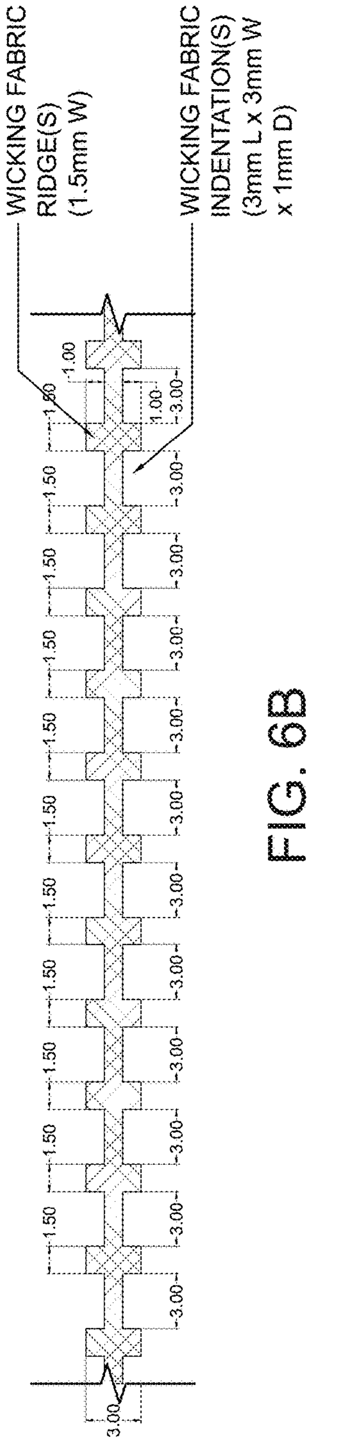
FIG. 6B is a sectional view of the fabric of FIG. 6A.
Figure 6C:
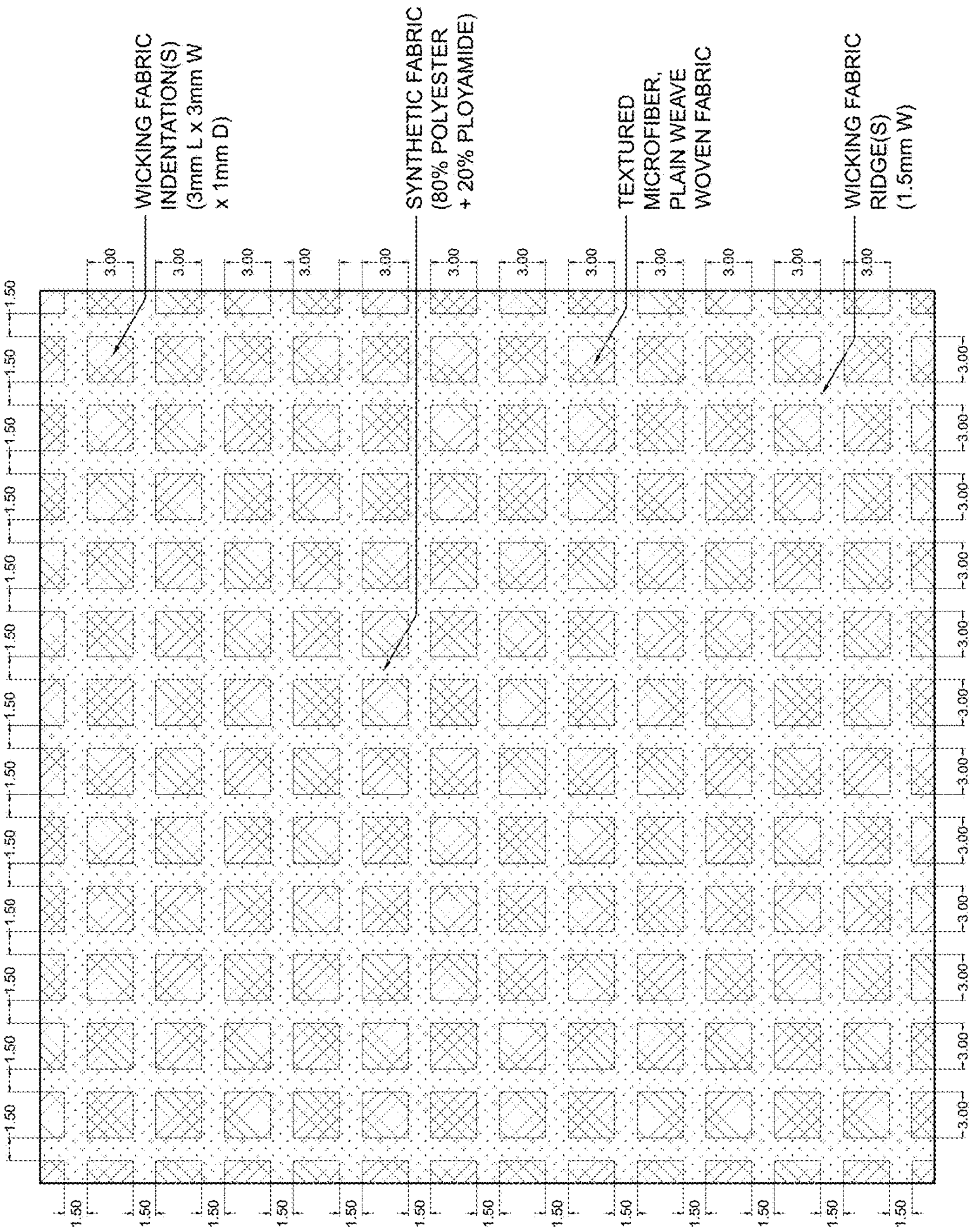
FIG. 6C is a detailed plan view of the fabric of FIG. 6A.

A key innovative feature of this invention is the introduction of microfiber Growtex® wicking layers 109A and 109B. These layers are constructed from a woven microfiber fabric featuring a unique waffle weave pattern (136; FIGS. 6A-C), composed of 80% Polyester and 20% Polyamide. The design of these wicking layers 109A and 109B allows for exceptional water movement, capable of moving water vertically up to 18 inches and ensuring even saturation across the living wall system. The Growtex® fabric has been extensively tested against fifty other materials and has proven superior in terms of capillary action and water distribution. This allows the living wall system to maintain optimal moisture levels, critical for plant health and water conservation. In one embodiment, the woven microfiber fabric is 141 cm in width. In some embodiments, the wicking fabric indentations are approximately 3 mm in length, 3 mm in width, and 1 mm in depth. In one embodiment, the woven microfiber fabric is a textured microfiber featuring a plain wave. In some embodiments, the wicking fabric ridges are approximately 1.5 mm in width.

Incorporated within the system is a needle-punched rockwool layer 201 derived from basalt and slag, offering a water retention capacity of 90% or greater per volume when used in a horizontal plane, such as on green roofs. However, when applied in a vertical orientation as in the current invention, the rockwool layer 201 tends to drain more rapidly and retain less water. To address this, the rockwool layer 201 is sandwiched between the Growtex® wicking layers 109A and 109B, which not only stabilize the water distribution but also increase the moisture retention of the rockwool layer 201 by 50%. This layering strategy ensures that the rockwool layer 201 is evenly saturated and retains moisture longer than when used alone, significantly enhancing the efficiency of the living wall system.

The construction of the living wall system is further optimized by dividing the installation into 2'×2' panels, each featuring a capillary break that aids in moisture retention and prevents excessive water runoff. The outermost Growtex® layer also serves as a protective barrier, shielding both the system and users from potential irritation caused by direct contact with the rockwool layer 201.

Finally, the outermost layer of the living wall system is a needle-punched geotextile made from recycled plastic, specifically post-consumer recycled PET. This material is not only environmentally friendly but also engineered to accommodate the expansion of plant roots. It includes pre-cut slits that serve as plant pockets, into which plants are inserted and secured using stainless steel staples, ensuring they remain in place even in adverse conditions.

This enhanced configuration of the living wall system provides a robust, efficient, and user-friendly solution that addresses the key challenges of installing and maintaining vertical gardens, particularly in urban environments.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A living wall system comprising:

a twin wall polycarbonate panel configured to be removably attached to a wall of a structure;

a first woven microfiber wicking layer positioned adjacent to the twin wall polycarbonate panel, the first woven microfiber wicking layer having a waffle weave pattern, composed of 80% Polyester and 20% Polyamide, configured to move water vertically up to 18 inches;

a needle-punched rockwool layer, wherein the needle-punched rockwool layer is derived from basalt and slag and is vertically positioned and configured for increased water retention capacity;

a second woven microfiber wicking layer positioned adjacent to the needle-punched rockwool layer, the second woven microfiber wicking layer having the same composition as the first woven microfiber wicking layer and configured to assist in evenly distributing and retaining water within the needle-punched rockwool layer;

a needle-punched geotextile layer made from post-consumer recycled Polyethylene Terephthalate (PET), positioned as the outermost layer, configured with pre-cut slits to serve as plant pockets for securing plants using stainless steel staples.

2. The living wall system of claim 1, wherein the twin wall polycarbonate panel provides structural support sufficient to allow modification and replacement of plants.

3. The living wall system of claim 1, wherein the first and second woven microfiber wicking layers are configured to provide water movement capabilities, enabling the system to maintain moisture levels for plant health and water conservation.

* * * * *